(12) United States Patent
Zhen et al.

(10) Patent No.: US 11,274,188 B2
(45) Date of Patent: Mar. 15, 2022

(54) NON-SILANE POLYMERIC COUPLER

(71) Applicants: Red Avenue New Materials Group Co., Ltd., Shanghai (CN); Tianjin University, Tianjin (CN)

(72) Inventors: Boming Zhen, Beijing (CN); Yu Chen, Tianjin (CN); Dong Dong, Beijing (CN); Ning Zhang, Shanghai (CN)

(73) Assignees: RED AVENUE NEW MATERIALS GROUP CO., LTD., Shanghai (CN); TIANJIN UNIVERSITY, Tianjin (CN)

( * ) Notice: Subject to any disclaimer, the term of this patent is extended or adjusted under 35 U.S.C. 154(b) by 183 days.

(21) Appl. No.: 16/578,864

(22) Filed: Sep. 23, 2019

(65) Prior Publication Data
US 2020/0377691 A1 Dec. 3, 2020

(30) Foreign Application Priority Data

May 29, 2019 (CN) .......................... 201910456382.1

(51) Int. Cl.
| C08K 5/18 | (2006.01) |
| C08K 5/20 | (2006.01) |
| C08K 3/36 | (2006.01) |
| B60C 1/00 | (2006.01) |
| C08K 5/372 | (2006.01) |
| C08K 5/11 | (2006.01) |
| C08G 83/00 | (2006.01) |
| C08L 23/22 | (2006.01) |
| C08K 3/22 | (2006.01) |
| C08K 5/24 | (2006.01) |
| C08K 3/06 | (2006.01) |
| C08K 5/548 | (2006.01) |
| C08L 9/06 | (2006.01) |
| C08L 9/00 | (2006.01) |

(52) U.S. Cl.
CPC .............. *C08K 5/18* (2013.01); *B60C 1/0016* (2013.01); *C08G 83/006* (2013.01); *C08K 3/36* (2013.01); *C08K 5/11* (2013.01); *C08K 5/20* (2013.01); *C08K 5/3725* (2013.01); *C08K 3/06* (2013.01); *C08K 3/22* (2013.01); *C08K 5/24* (2013.01); *C08K 5/548* (2013.01); *C08K 2003/2296* (2013.01); *C08L 9/00* (2013.01); *C08L 9/06* (2013.01); *C08L 23/22* (2013.01)

(58) Field of Classification Search
CPC ........... C08K 3/36; C08L 9/00; C08G 83/002; C08G 83/003; C08G 83/004; C08G 83/005; C08G 83/006; C08G 65/334; C09C 3/10
See application file for complete search history.

(56) References Cited

U.S. PATENT DOCUMENTS

| 3,475,251 | A | * | 10/1969 | Widmer | ................ | C08F 228/00 156/334 |
| 5,658,465 | A | * | 8/1997 | Nicholas | ................... | C02F 5/12 210/698 |
| 6,020,457 | A | * | 2/2000 | Klimash | ................ | B82Y 30/00 424/DIG. 16 |
| 6,395,867 | B1 | * | 5/2002 | Maignan | .................. | A61K 8/84 528/310 |
| 2004/0020576 | A1 | * | 2/2004 | Frank | .................... | B60C 1/0008 152/450 |
| 2010/0137520 | A1 | * | 6/2010 | Robertson | ............... | C08L 21/00 525/236 |
| 2010/0179280 | A1 | * | 7/2010 | Kameda | .................... | C08L 9/06 524/575 |
| 2012/0108718 | A1 | * | 5/2012 | Yukimura | .............. | C09D 5/002 524/188 |
| 2012/0289640 | A1 | * | 11/2012 | Tohyama | ............... | C08K 5/101 524/424 |
| 2015/0126657 | A1 | * | 5/2015 | Okel | ........................ | C08K 9/08 524/300 |

OTHER PUBLICATIONS

Frein (Liquid-Crystalline Thiol- and Disulfide-Based Dendrimers for the Functionalization of Gold Nanoparticles, Helvetica Chimica Acta, 91, 2008, pp. 2321-2337).*

Wan (Synthesis of a Thioether Modified Hyperbranched Polyglycerol and Its Template Effect on Fabrication of CdS and CdSe Nanoparticles. Journal of Applied Polymer Science, 102, 2006, pp. 3679-3684).*

Xia (Dually Stimuli-Responsive Hyperbranched Polyethylenimine with LCST Transition Based on Hydrophilic-Hydrophobic Balance. Journal of Applied Polymer Science, 2013, pp. 3249-3255).*

Chechik (Monolayers of Thiol-Terminated Dendrimers on the Surface of Planar and Colloidal Gold, Langmuir, 1999, pp. 6364-6369).*

Schomer (Hyperbranched Aliphatic Polyether Polyols, Polymer Science, Part A: Polymer Chemistry, 2013, 51, pp. 995-1019).*

* cited by examiner

*Primary Examiner* — Brieann R Johnston
(74) *Attorney, Agent, or Firm* — Xsensus LLP

(57) ABSTRACT

The present disclosure relates to a non-silane polymeric coupler. The non-silane polymeric coupler may include a dendritic polymer core having at least one reactive end group. The at least one reactive end-group may be selected from the group consisting of thiol, thioester, thioether, sulfanyl, mercapto, sulfide, and disulfide.

19 Claims, 2 Drawing Sheets

NON-SILANE POLYMERIC COUPLER

CROSS-REFERENCE TO RELATED APPLICATION

This application claims benefit of the filing date of Chinese Patent Application No. 201910456382.1 filed on May 29, 2019, the disclosure of which is hereby incorporated in its entirety by reference.

TECHNICAL FIELD

The present disclosure relates a polymer technology, and in particular, to a non-silane polymeric coupler.

BACKGROUND

Silica has become an indispensable part of technological solution to rubber reinforcement as an alternative to carbon black. For high performance tires, silica fillers can potentially provide low rolling resistance, reduced abrasive wear, and improved wet-skid resistance in comparison to carbon black. However, such advantage can be realized only when the surface of silica filler is pretreated with silane agents. Bifunctional silanes capable of producing covalent bonds between the silica and the rubber are usually necessary particularly for the tire industry. The bifunctional silanes are generally termed coupling agents or couplers. Among the common couplers, bis[3-(triethoxysilyl) propyl] tetrasulfide (TESPT) is perhaps the most widely used.

BRIEF SUMMARY

One example of the present invention provides a non-silane polymeric coupler. The non-silane polymeric coupler may comprise a dendritic polymer core having at least one reactive end group. The at least one reactive end-group may be selected from the group consisting of thiol, thioester, thioether, sulfanyl, mercapto, sulfide, and disulfide.

It was surprisingly found that non-silane polymeric couplers with a specific molecular geometry are at least as effective as the conventional sulfur containing organosilicon coupling agents, such as Si-69 and Si-363 from Degussa, making them especially useful for a vulcanizable rubber composition suitable for pneumatic tire, especially for pneumatic tire tread. Some objects of the present invention are realized with a non-silane polymeric coupler comprising a dendritic polymer core with at least one reactive group toward diene-based rubber.

Some embodiments of the present invention provide a vulcanizable rubber composition containing a non-silane polymeric coupler comprising a dendritic polymer core with at least one reactive group toward diene-based rubber.

Some embodiments of the present invention provide a vulcanizable rubber composition for pneumatic tire containing a non-silane polymeric coupler comprising a dendritic polymer core with at least reactive group toward diene-based rubber.

Some embodiments of the present invention provide a process for manufacturing a non-silane polymeric couple, comprising the steps of providing a dendritic polymer core capable of interacting with silica, and attaching at least one reactive group toward diene-based rubber to said dendritic polymer core as end group.

Further advantages and embodiments of the present invention will become apparent from the following description.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Figure 1A:
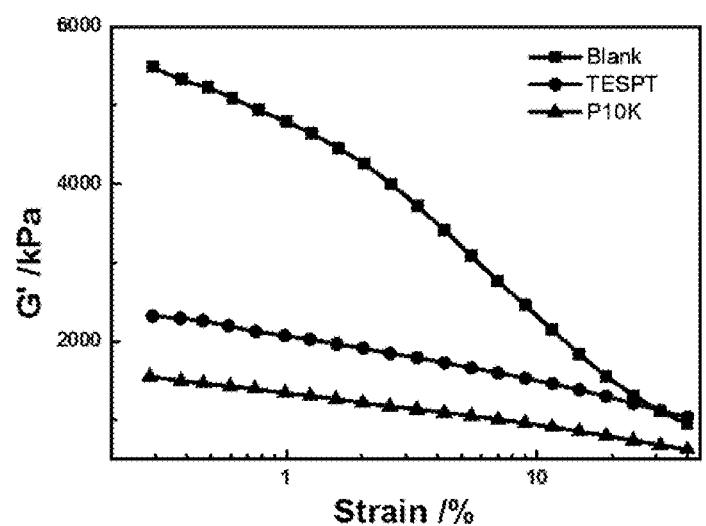
FIG. 1a is rubber processing analyzer (RPA) data of Comparative Examples.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1a and 1b. When referring to the FIGURES, like structures and elements shown throughout are indicated with like reference numerals.

The terms "coupler" and "coupling agent" may be used interchangeably, which means an agent that tightly bridges silica and diene-based elastomer or rubber together.

The term "DB" as used in the present application is an abbreviation for degree of branching.

The term "dendritic polymer" as used in the present application comprises dendrimers and hyperbranched polymers.

The term "dendrimers" as used in the present application means well-defined monodisperse structures in which all branch points are used (DB=100%). Dendrimers are usually obtained by a multi-step synthesis.

The term "hyperbranched polymer" as used in the present application means a polymer having a plurality of branch points and multifunctional branches that lead to further branching with polymer growth. Hyperbranched polymers are usually obtained by a one-step polymerization process and form a polydisperse system with varying degrees of branching (DB<100%).

The term "end group" as used in the present application means the terminal group on a branch. In the case of a dendrimer or hyperbranched polymer, a plurality of end groups is present.

Dendritic Polymers

The non-silane polymeric coupler according to one embodiment of the present invention contains a core of dendritic polymer, e.g. a dendrimer or a hyperbranched polymer. The non-silane polymeric coupler according to the embodiment of the present invention has preferably a core of a hyperbranched polymer.

Dendrimers are characterized by cascade-type branching, i.e. a branch-on-branch topology. In one embodiment, dendrimers exhibit well-defined monodisperse structures in which all branch points are used (DB=100%). Dendrimers are usually prepared in a multi-step synthesis, based on repeated branching and deprotection schemes as disclosed by NEWCOME, G. R., et al. Dendritic Molecules: Concepts, Synthesis, Perspectives. VCH: WEINHEIM, 2001, which is incorporated by reference herein in its entirety. Dendrimer synthesis strategies generally aim at fully branched polymers. Polyamidoamine dendrimers and polypropyleneimine dendrimer may be produced in kilogram scale and distributed commercially.

Hyperbranched polymers are usually accessible in one-step process and are often considered to be ill-defined or "the poor cousins of dendrimers", because of their commonly high polydispersity. In addition, hyperbranched polymers are usually characterized by a random distribution of functional groups throughout their globular structure.

Hyperbranched Polymer Core (HPC)

The hyperbranched polymer for a core of a non-silane polymeric coupler according to the present invention preferably comprises a plurality of functional end groups. Particularly preferred in the present invention are hyperbranched polymers with a plurality of end groups selected from the group consisting of hydroxyl, carboxylic acid, primary amine, secondary amine, phosphoric acid and combinations thereof. In one embodiment, the hyperbranched polymers have a plurality of hydroxyl groups.

Any hyperbranched polymer can be used as a polymer core in the polymeric couplers. In one embodiment, the hyperbranched polymer includes hyperbranched polyglycidols or hyperbranched copolymers of glycidol and other epoxides. The hyperbranched polymer can be readily prepared with a narrow molecular weight distribution in a single step procedure from commercially available monomers over a broad range of molecular weights. The reaction of these core polymers with at least one reactive group toward diene-based rubber yields a class of non-silane hyperbranched polymeric couplers according to one embodiment of the present invention.

Some suitable hyperbranched polymers for the cores of non-silane polymeric couplers are disclosed in W. Hayes et al. Synthesis and applications of hyperbranched polymers. European Polymer Journal, 2004, vol. 40, p. 125'7-1281, which is incorporated by reference herein in its entirety. Table 1 shows four representative examples of hyperbranched polymers, without being limited thereto, for the cores of non-silane polymeric couplers. HPC-1 is a Polyglycerol. HPC-2 is a Poly 2,2-dimethylol-propionic acid. HPC-3 is a Polyamidoamine. HPC-4 is a Polyethylenimine (PEI). In one embodiment, the hyperbranched polymers for the cores of non-silane polymeric couplers preferably contain O and N heteroatoms. In one embodiment, the hyperbranched polymer containing the O and N heteroatoms contains an ether bond (—O—), an amide bond

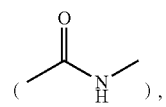

a urethane bond (—NHCOO—), an imine bond (—NH—), a tertiary amine

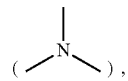

an ester bond

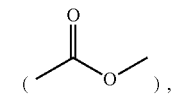

a hydroxyl group (—OH), a primary amine group (—NH$_2$), a urea group

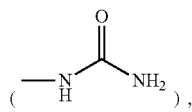

and the like. Since the heteroatoms contained in the hyperbranched polymer structure can interact with the hydroxyl groups on the surface of the silica, it facilitates the dispersion of the silica.

TABLE 1
HPC-1
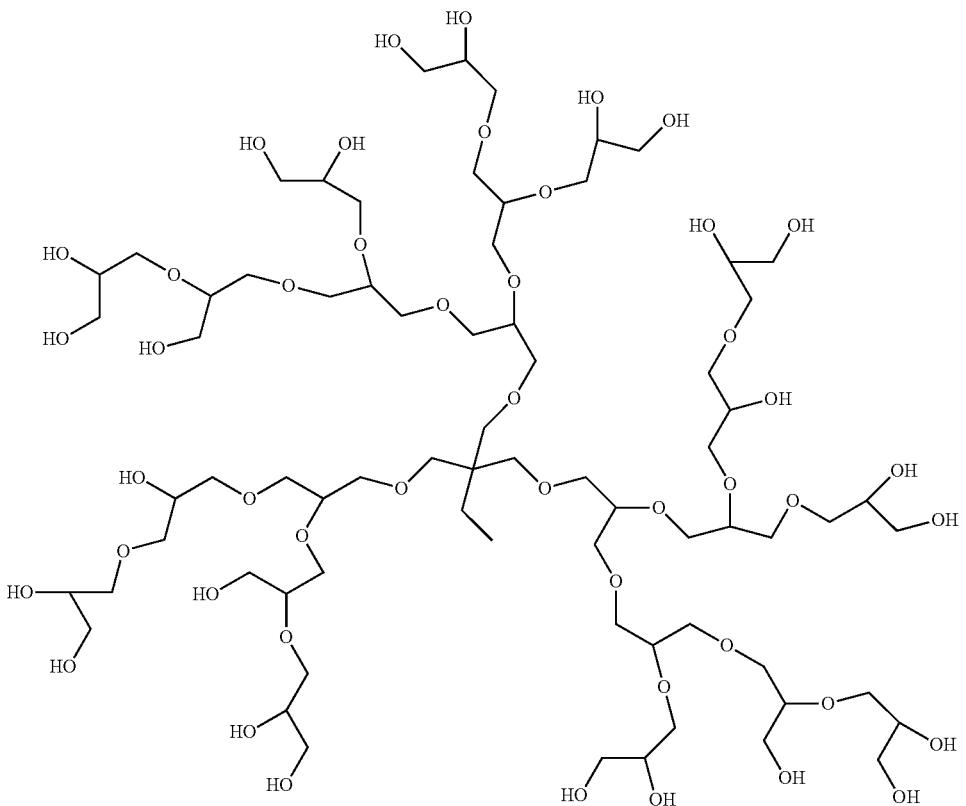 [SMILES: CCC(COCC(COCC(O)COCC(O)CO)OCC(CO)OCC(O)CO)(COCC(COCC(COCC(CO)OCC(O)CO)OCC(O)CO)OCC(COCC(O)CO)OCC(O)CO)COCC(COCC(COCC(CO)OCC(O)CO)OCC(O)CO)OCC(COCC(O)CO)OCC(O)COCC(O)CO]
HPC-2
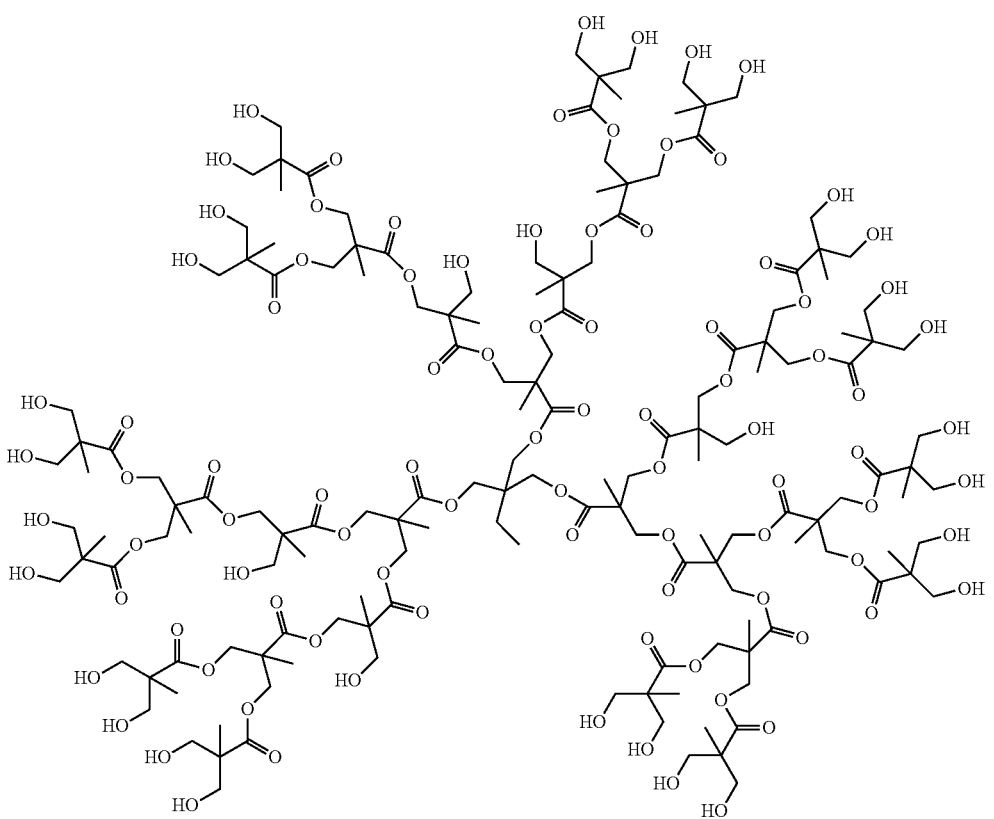 [SMILES: CCC(COC(=O)C(C)(COC(=O)C(C)(CO)COC(=O)C(C)(COC(=O)C(C)(CO)CO)COC(=O)C(C)(CO)CO)COC(=O)C(C)(CO)COC(=O)C(C)(COC(=O)C(C)(CO)CO)COC(=O)C(C)(CO)CO)(COC(=O)C(C)(COC(=O)C(C)(CO)COC(=O)C(C)(COC(=O)C(C)(CO)CO)COC(=O)C(C)(CO)CO)COC(=O)C(C)(CO)COC(=O)C(C)(COC(=O)C(C)(CO)CO)COC(=O)C(C)(CO)CO)COC(=O)C(C)(COC(=O)C(C)(CO)COC(=O)C(C)(COC(=O)C(C)(CO)CO)COC(=O)C(C)(CO)CO)COC(=O)C(C)(COC(=O)C(C)(COC(=O)C(C)(CO)CO)COC(=O)C(C)(CO)CO)COC(=O)C(C)(COC(=O)C(C)(CO)CO)COC(=O)C(C)(CO)CO]

TABLE 1-continued

HPC-3

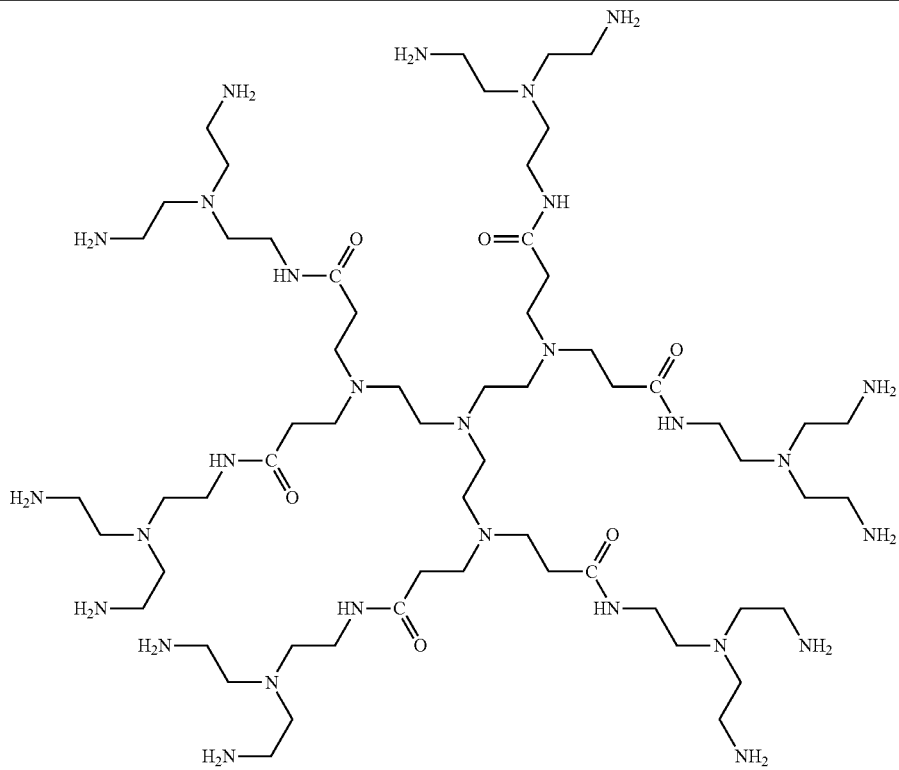

HPC-4

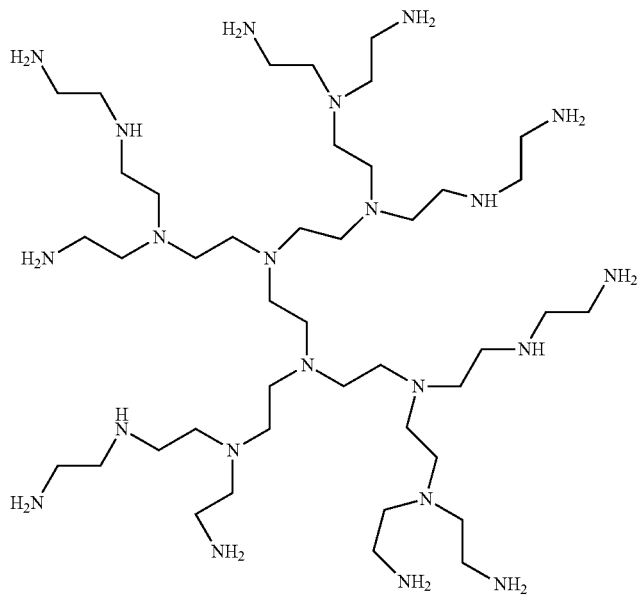 [SMILES: NCCNCCN(CCN)CCN(CCN(CCNCCN)CCN(CCN)CCN)CCN(CCN(CCN)CCNCCN)CCN(CCNCCN)CCN(CCN)CCN]

Non-Silane Polymeric Couplers

The non-silane polymeric coupler according to one embodiment of the present invention comprises a dendritic polymer core with at least one reactive end-group toward diene-based rubber.

The non-silane polymeric coupler according to one embodiment of the present invention comprises a dendritic polymer core with preferably 10%-50% end-groups being transformed into reactive groups toward diene-based rubber, and more preferably 30%-40% end-groups being transformed into reactive groups toward diene-based rubber. The reactive group toward diene-based rubber may be selected from the group consisting of thiol, thioester, thioether, sulfanyl, mercapto, sulfide, disulfide and combinations thereof. The reactive group toward diene-based rubber is preferably selected from thiol and sulfide. In one embodiment, the reactive group toward diene-based rubber is thiol.

In one embodiment, the non-silane polymeric coupler contains a disulfide bond or bridge. The disulfide bond may be cleaved and transformed into reactive groups toward diene-based rubber.

The dendritic polymer core of non-silane polymeric coupler according to one embodiment of the present invention may be further derivatized with a compatibilizing moiety that favors the well-disperse of silica in rubber. Preferably 10%-50% end-groups of the dendritic polymer core are transformed into compatibilizing groups, and more preferably 30%-40% end-groups are transformed into compatibilizing groups. The compatibilizing group is selected from hydrophobic groups. The compatibilizing group may be selected from the hydrophobic groups consisting of alkyl, aryl, alkylaryl, arylalkyl, alkylalkoxy, arylalkoxy, said alkyl and/or said aryl optionally having one or more hydroxyl groups, and more preferably selected from alkyl group, and most preferably selected from linear alkyl group.

In one embodiment, the non-silane polymeric coupler is obtained by attaching the at least one reactive group to a hyperbranched polymer as a part of end groups. The hyperbranched polymer includes at least a polymer selected from the group consisting of a polyglycerol, a poly 2,2-dimethylol-propionic acid, a polyamidoamine, a polyethylenimine, and a combination thereof. In one embodiment, the hyperbranched polymer comprises a hyperbranched polyglycidol or a hyperbranched copolymer of glycidol and an epoxide.

In one embodiment, the hyperbranched polymer comprises a polyethylenimine. The imine group and the amino group in the polyethylenimine (PEI) can react with the hydroxyl group on the surface of the silica to form a protective film on the surface of the silica to act as a barrier to silica, thereby facilitating dispersion of silica. The properties exhibited by polyethylenimine in the rubber composite are to improve the dispersion of silica, reduce heat generation, and increase Tan δ at 0° C. However, since polyethylenimine contains a large amount of amino groups, imine groups and tertiary amines, the scorch time is obviously shortened, thereby affecting processing safety of rubber.

In one embodiment, a modified polyethylenimine is a long-chain structure with a non-polar long chain and/or a hetero atom bonded to the surface of PEI. The purpose is to reduce the content of imine groups and amino groups in PEI, and to reduce the polarity of PEI molecules and the compatibility with rubber. In addition, the purpose of introducing a sulfur-containing hetero atom is to be able to participate in the rubber vulcanization reaction and to increase the interface with the rubber.

There is certain advantage associated with the use of polyethylenimine based non-silane polymeric coupler in the present embodiments. For example, there is no organic by-product formation during the reaction of polyethylenimine and silica. There is no VOC emission, and the quality of rubber products is not negatively affected. Thus, polyethylenimine is a green environmental protection processing aid. In contrast, the by-product of reaction of the conventional silane polymeric coupler, Bis[3-triethoxysilyl]propyl] tetrasulfide (TESPT), and silica is ethanol, which will produce VOC emissions. Furthermore, If TESPT and silica are still reacting during the rubber vulcanization stage, bubbles will be generated inside the rubber, thereby decreasing the quality of rubber products.

Vulcanizable Rubber Composition

The non-silane polymeric coupler according to one embodiment the present invention can be used in any vulcanizable rubber composition. The non-silane polymeric coupler according to one embodiment of the present invention can be preferably used in vulcanizable rubber composition for pneumatic tire. The non-silane polymeric coupler according to one embodiment of the present invention can be more preferably used in vulcanizable rubber composition for pneumatic tire tread.

In one embodiment, a vulcanizable rubber composition at least comprising:
(A) a diene-based rubber;
(B) from about 50 to about 150 parts by weight of silica per 100 parts by weight of rubber (phr); and
(C) from about 0.5 to about 20 phr of a non-silane polymeric coupler.

The term "phr" as used herein, and according to conventional practice, refers to "parts by weight of a respective material per 100 parts by weight of rubber."

In one embodiment, the vulcanizable rubble composition may further comprise a small amount of Bis[3-triethoxysilyl]propyl]tetrasulfide (TESPT).

The rubber composition according to one embodiment of the present invention may include one or more rubbers containing olefinic unsaturation. The phrase "rubber containing olefinic unsaturation" includes both natural rubber and its various raw and reclaimed forms as well as various synthetic rubbers. Representative synthetic rubbers include homopolymerized products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers.

The rubber composition may include from about 50 phr to about 150 phr of silica. In one embodiment, from 60 phr to 120 phr, preferably 70 phr to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in some embodiments of this invention are precipitated silicas such as, for example, those obtained by the acidification of a soluble silicate, e.g., sodium silicate.

The conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 1 to 150 phr. In one embodiment, from 20 phr to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm/100 g.

Other fillers may be used in the rubber composition. The other fillers may include, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from about 1 phr to 30 phr.

The rubber composition may further include a non-silane polymeric coupler according to one embodiment of the present invention. Non-silane polymeric coupler may be used in an amount ranging from about 0.5 phr to about 20 phr. In one embodiment, the non-silane polymeric coupler is used in an amount ranging from about 1 phr to about 10 phr. In one embodiment, the polymeric non-silane coupling agent is used in an amount ranging from about 4 phr to about 7 phr.

It is readily understood by those having ordinary skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those of ordinary skill in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4 phr, alternatively about 0.8 to about 1.5, phr. In another embodiment, combinations of a primary and a secondary accelerator might be used with the secondary accelerator being used in smaller amounts, such as from about 0.05 phr to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having ordinary skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) at the preceding non-productive mix stage (s). The terms "non-productive" and "productive" mix stages are well known to those having ordinary skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having ordinary skill in such art.

This present invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Synthesis of Non-Silane Polymeric Couplers
Polyglycidol Core Based Non-Silane Polymeric Couplers:

This example illustrates the synthesis of a non-silane polymeric coupler with a hyperbranched polyglycidol core and thiol groups used for the reactive groups toward diene rubber and dodecanoyl groups as compatibilizing groups. The non-silane polymeric coupler PC-1 to PC-2 are represented by generalized formula PC-A below.

Generalized Formula PC-A

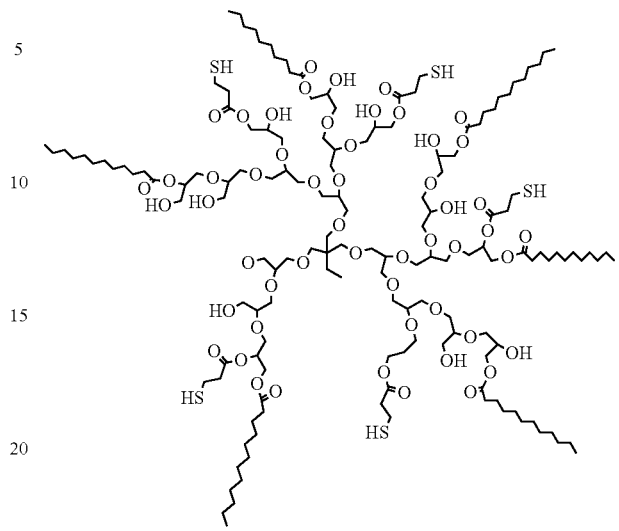

The synthesis is performed according to the following scheme:

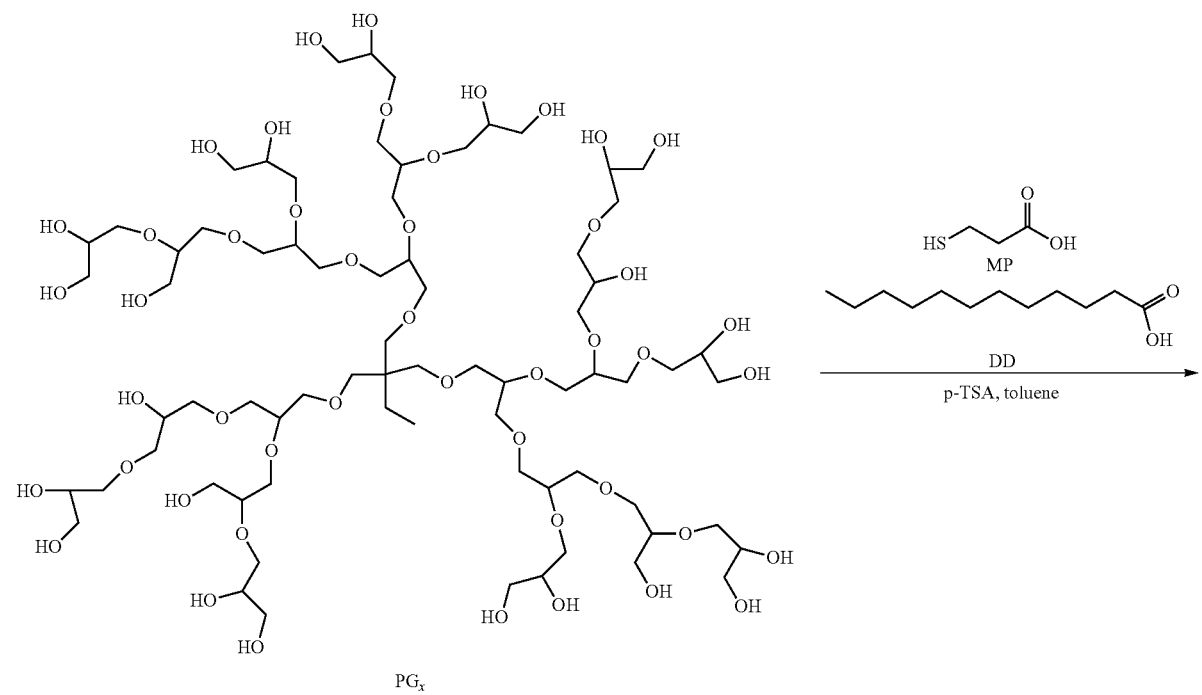

The hyperbranched polyglycidol $PG_{33}$, selected for this example, was a hyperbranched polyglycidol with 33 hydroxyl groups on average.

Synthesis of Non-Silane Polymeric Coupler PC-1 ($PG_{33}MP_{11}DD_{11}$):

2 g of polyglycidol $PG_{33}$, 3-mercaptopropionic acid (0.33 eq relative to the amount of OH of PG), dodecanoic acid (0.33 eq relative to the amount of OH of PG) and p-toluenesulfonic acid (0.1 eq relative to the amount of OH of PG) were added into a 100 mL flask with a magnetic stirrer and equipped with a Dean-Stark. 40 mL toluene was added. The mixture was heated to 136° C. for 1 hour. The mixture was washed twice with 10% NaOH aq, and then three times with deionized water. The organic phase was dried over anhydrous $Na_2SO_4$. The solvent was removed under reduced pressure and the residue was dried overnight under reduced pressure at 40° C.

The obtained polymeric coupler PC-1 was a hyperbranched polyglycidol with 33 hydroxyl end groups on average, where 11 on average were acylated with 3-mercaptopropionic acid and 11 on average were acylated with dodecanoic acid. The polymeric coupler PC-1 has a numeric average molecular weight of $5.49 \times 10^3$ g/mol.

Synthesis of Non-Silane Polymeric Coupler PC-2 ($PG_{66}MP_{22}DD_{22}$):

The non-silane polymeric coupler PC-2 was prepared in the same manner as non-silane polymeric coupler PC-1 except that the hyperbranched polyglycidol $PG_{66}$, a hyperbranched polyglycidol with 66 hydroxyl groups on average, was used instead of the hyperbranched polyglycidol $PG_{33}$.

The obtained non-silane polymeric coupler PC-2 was a hyperbranched polyglycidol with 66 hydroxyl end groups on average, where 22 on average were acylated with 3-mercaptopropionic acid and 22 on average were acylated with dodecanoic acid. The polymeric coupler PC-2 has a numeric average molecular weight of $1.11 \times 10^4$ g/mol.

Polyethylenimine Core Based Non-Silane Polymeric Couplers:

This example illustrates the synthesis of a non-silane polymeric coupler with a hyperbranched polyethylenimine core and thiol groups used for the reactive groups toward diene rubber and octadecanoyl groups as compatibilizing groups. The non-silane polymeric coupler PC-3 to PC-4 are represented by generalized formula PC-B.

Generalized Formula PC-B

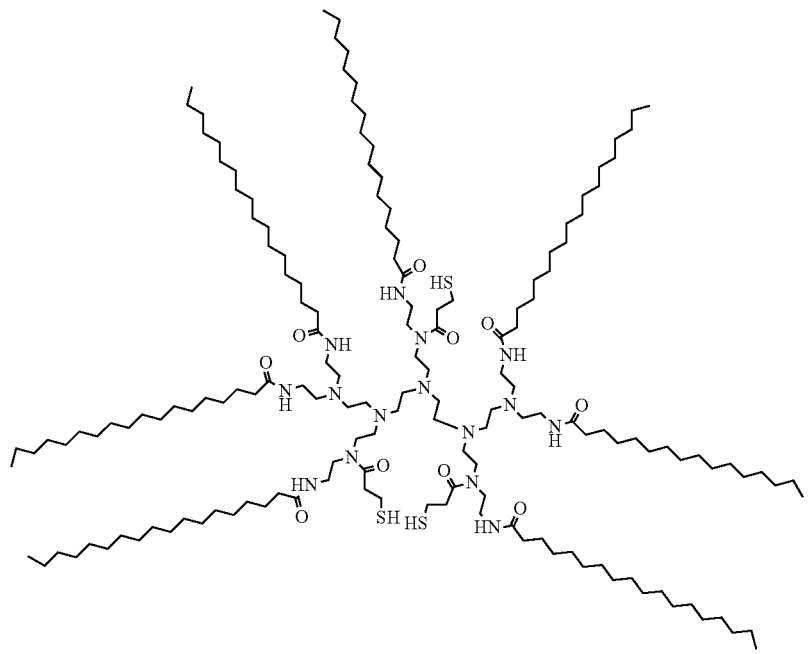 [SMILES: CCCCCCCCCCCCCCCCCC(=O)NCCN(CCNC(=O)CCCCCCCCCCCCCCC)CCN(CCN(CCN(CCN(CCNC(=O)CCCCCCCCCCCCCCCCC)CCNC(=O)CCCCCCCCCCCCCCCCC)CCN(CCNC(=O)CCCCCCCCCCCCCCCCC)C(=O)CCS)CCN(CCNC(=O)CCCCCCCCCCCCCCCCC)C(=O)CCS)CCN(CCNC(=O)CCCCCCCCCCCCCCCCC)C(=O)CCS]

The synthesis is performed according to the following scheme:

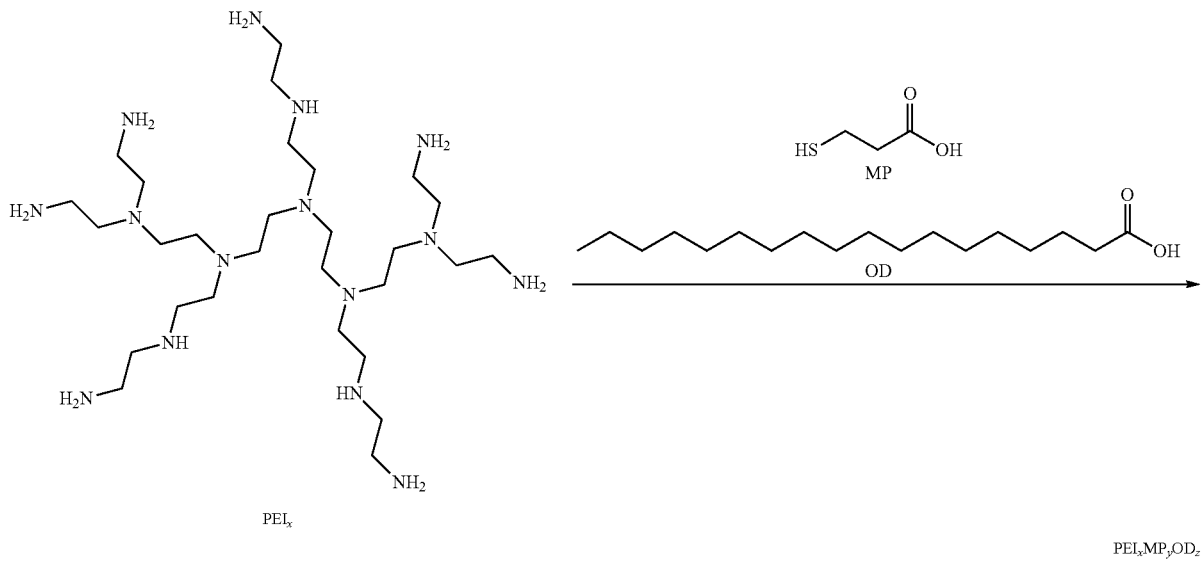

The hyperbranched polyethylenimine PEI1.8K, selected for this example, was a hyperbranched polyethylenimine with 30 primary and secondary amine groups on average.
Synthesis of Non-Silane Polymeric Coupler PC-3 (PEI1.8KMP$_{13}$DD$_{13}$):

2.6 g of polyethylenimine PEI1.8K, 3-mercaptopropionic acid (0.41 eq relative to the amount of primary and secondary amine groups of PEI), and octadecanoic acid (0.41 eq relative to the amount of primary and secondary amine groups of PEI) were mixed together in a 100 mL flask with a magnetic stirrer. The mixture was heated at 160° C. for 2 hours with nitrogen gas flow to take away the generated water.

The obtained polymeric coupler PC-3 was a hyperbranched polyethylenimine with 30 primary and secondary amine end groups on average, where 13 on average were amidated with 3-mercaptopropionic acid and 13 on average were amidated with octodecanoic acid. The polymeric coupler PC-3 has a numeric average molecular weight of 6.27×10$^3$ g/mol.

Synthesis of Non-Silane Polymeric Coupler PC-4 (PEI10K MP$_{95}$DD$_{95}$):

The non-silane polymeric coupler PC-4 was prepared in the same manner as non-silane polymeric coupler PC-3 except that the hyperbranched polyethylenimine PEI10K, a hyperbranched polyethylenimine with 232 primary and secondary amine groups on average, was used instead of the hyperbranched polyethylenimine PEI1.8K.

The obtained non-silane polymeric coupler PC-4 was a hyperbranched polyethylenimine with 232 primary and secondary amine end groups on average, where 95 on average were acylated with 3-mercaptopropionic acid and 95 on average were acylated with dodecanoic acid. The polymeric coupler PC-4 has a numeric average molecular weight of 4.37×10$^4$ g/mol.

Compositions of Rubber Composites

Composite rubber compositions were mixed in a laboratory mixer in a multi-step mixing process following the recipe given in Table 2 (all amounts in phr). Non-silane polymeric coupler was added in a first non-productive mix step. All compositions further include standard amounts of compounding additives, such as oils, waxes, antidegradants, and curatives. Four rubber compositions were mixed accordingly.

TABLE 2 comparison of recipes of rubber compositions:

| Composition | Blank | Comparative Example 1 | Comparative Example 2 | Example 1 | Example 2 |
|---|---|---|---|---|---|
| SSBR2564S | 96.3 | 96.3 | 96.3 | 96.3 | 96.3 |
| BR9000 | 30 | 30 | 30 | 30 | 30 |
| Silica/VN3 | 70 | 70 | 70 | 70 | 70 |
| Bis[3-(triethoxysilyl)propyl] tetrasulfide (TESPT) | 0 | 6.3 | 0 | 0 | 0 |
| PC-4 | 0 | 0 | 0 | 6.3 | 0 |
| PC-3 | 0 | 0 | 0 | 0 | 6.3 |
| P10K | 0 | 0 | 6.3 | 0 | 0 |
| Stearic acid (SA) | 2 | 2 | 2 | 2 | 2 |
| ZnO | 3.5 | 3.5 | 3.5 | 3.5 | 3.5 |
| N-tert-butyl-2-benzothiazole sulfenamide (TBBS) | 2 | 2 | 2 | 2 | 2 |

TABLE 2-continued comparison of recipes of rubber compositions:

| Composition | Blank | Comparative Example 1 | Comparative Example 2 | Example 1 | Example 2 |
|---|---|---|---|---|---|
| Diphenylhydrazine (DPG) | 2 | 2 | 2 | 2 | 2 |
| N-(1,3-dimethyl)butyl-N'-phenyl-p-phenylenediamine (DMBPPD) | 1 | 1 | 1 | 1 | 1 |
| Sulfur (S) | 1.7 | 1.7 | 1.7 | 1.7 | 1.7 |

P10K has a PEI number average molecular weight of 10,000 and does not contain sulfur.

Processing of Composite Materials

Rubber compounds were mixed in a laboratory mixer in a multi-step mixing process following the recipe given in Table 2 (all amounts in phr). Non-silane polymeric coupler was added in a first non-productive mix step. All compounds further include standard amounts of compounding additives, such as oils, waxes, antidegradants, and curatives. Four rubber compounds were mixed accordingly.

The composite materials are processed as follows:

1. Mixing: first, SSBR2564S+BR9000 were added to an internal mixer with the temperature of 100° C. and rotation at 40 rpm. The materials were masticated for 2 min in the mixer, and an anti-aging agent was added after the torque is stable. Then, a white carbon black and coupler mixture was added in three times, each time with one third of the total white carbon black and coupler mixture. After the addition, the speed was increased to 150° C. and the materials were heat treated for 6 min. Then, the film was discharged and cooled.

2. Open refining:
   (1) One section of the mixing rubber is cut 3 times each on the left and the right when being cooled by the cooling water on the mill.
   (2) Add ZnO and SA, and cut the knife left and right three times.
   (3) Add NS, promote D, and cut the knife three times each time.
   (4) Add sulfur S, cool the water to the left and right cutters 3 times each, and wind and package each 3 times.
   (5) Produce a film.

3. vulcanization.

Experimental Results

The mooney viscosity was by a Mooney Viscometer (MV2000, ALPHA, USA) at 100° C. with 1+4 mins.

TABLE 3

Mooney viscosity:

| | Blank | Comparative Example 1 | Comparative Example 2 | Example 1 | Example 2 |
|---|---|---|---|---|---|
| Mooney viscosity | 246 | 100 | 95 | 115 | 109 |

The vulcanization data is measured by a Rotorless Vulcanizer (MDR2000, ALPHA, USA). Vulcanization curve test conditions: 150° C., 30 min.

TABLE 4

Vulcanization data:

| | Blank | Comparative Example 1 | Comparative Example 2 | Example 1 | Example 2 |
|---|---|---|---|---|---|
| Scorching time T10/min | 43 | 100 | 53 | 63 | 81 |
| Vulcanization time T90/min | 150 | 100 | 61 | 106 | 98 |
| Torque ML/dNm | 213 | 100 | 89 | 138 | 125 |
| Torque MH/dNm | 125 | 100 | 80 | 109 | 107 |
| Torque difference ΔM/dNm | 86 | 100 | 76 | 97 | 100 |

The mechanical data before aging is measured by a3365 type tensile machine (Instron Company, USA).

TABLE 5

Mechanical data before aging:

| | Blank | Comparative Example 1 | Comparative Example 2 | Example 1 | Example 2 |
|---|---|---|---|---|---|
| Hardness/A | 98 | 100 | 82 | 89 | 89 |
| Modulus at 100% (MPa) | 71 | 100 | 42 | 73 | 83 |
| Modulus at 300% (MPa) | 43 | 100 | 21 | 47 | 53 |
| Tensile stress (MPa) | 87 | 100 | 64 | 78 | 88 |
| Elongation at break (%) | 159 | 100 | 224 | 196 | 142 |
| Tension set (%) | 208 | 100 | 300 | 100 | 67 |

Rubber processing analyzer (RPA) data is measured by a Rubber Processing Analyzer (RPA2000, ALPHA, USA). RPA test conditions: 60° C., 10 Hz, 0~40%.

Figure 1B:
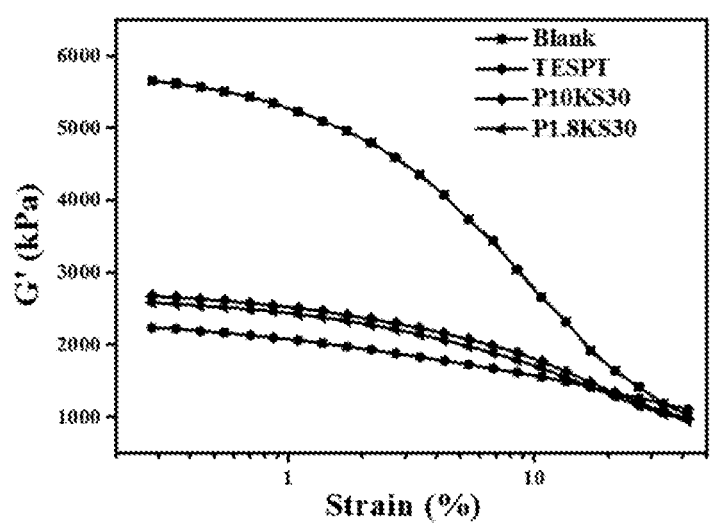
FIG. 1b is rubber processing analyzer (RPA) data of Examples and Comparative Examples.

The RPA data for three comparative Examples is shown in FIG. 1(a). The RPA data for blank example, Comparative Example 1, and Examples 1 and 2 is shown in FIG. 1(b). As shown in FIGS. 1 a and 1b, the Panye effect for Examples 1 and 2 is significantly lower than the blank example, slightly worse than Comparative Example 1 (TESPT), and the white carbon black dispersion performance is improved.

The mechanical data is measured by a Dynamic Mechanical Analyzer—(DMA, METTLER, USA). DMA test conditions: frequency 10 Hz, strain 0.3%, temperature scan −80~100° C.

TABLE 6

Dynamic mechanical analysis (DMA) data:

| | Blank | Comparative Example 1 | Comparative Example 2 | Example 1 | Example 2 |
|---|---|---|---|---|---|
| 0° C. Tanδ | 85 | 100 | 101 | 105 | 108 |
| 60° C. Tanδ | 104 | 100 | 91 | 99 | 88 |

The wet skid resistance (0° C. Tan δ) for Examples 1 and 2 is better than that of the TESPT-containing compound and blank compound, and the dynamic heat generation (60° C. Tan δ) for Examples 1 and 2 is lower than that of the TESPT-containing compound and blank compound. Specifically, the wet skid resistance of Examples 1 and 2 (the greater the 0° C. Tan δ is, the better) is much greater than that of Comparative Examples 1 and 2 and Blank. Dynamic heat generation of Example 2 (the smaller the Tan δ at 60° C., the better) is much smaller than that of Comparative Examples 1 and 2 and Blank. In summary, as shown in the above experimental results, the sulfur-containing modified polyethylenimine has no VOC emission during the reaction with silica, and is a green environmental protection additive. Furthermore, regarding the physical properties, the hyperbranched polymer non-silane coupler according to some embodiments of the present invention has a comparable vulcanization time as low molecular weight PEI, comparable mechanical properties as Comparative Example 2 including TESPT, smaller tension set, and improved wet skid resistance and dynamic thermal properties of the rubber composites. That is, the non-silane polymer coupling agent has no VOC emission during the reaction with white carbon black, and is a green environmental protection additive. Physical properties, vulcanization data and mechanical properties of Example 2 of the present invention are comparable to those of Comparative Example 2 (the rubber composition containing TESPT). Furthermore, rubber of Example 2 has a small permanent deformation, which can significantly improve the wet skid resistance and Dynamic heat generation performance of the rubber.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A non-silane polymeric coupler, comprising a dendritic polymer core having at least one reactive end group, and
   at least one compatibilizing end group, and the compatibilizing end group is configured to improve compatibility of silica with a vulcanizable rubber,
   wherein the at least one reactive end-group is selected from the group consisting of thiol, thioester, thioether, sulfanyl, mercapto, sulfide, and disulfide,
   the at least one reactive end group constitutes about 10% to about 50% of end groups of the non-silane polymeric coupler, and
   the at least one compatibilizing end group constitutes about 10% to about 40% of end groups of the non-silane polymeric coupler.

2. The non-silane polymeric coupler according to claim 1, wherein the dendritic polymer core is a dendrimer core.

3. The non-silane polymeric coupler according to claim 1, wherein the dendritic polymer core is a hyperbranched polymer core.

4. The non-silane polymeric coupler according to claim 1, wherein the dendritic polymer core comprises O or N or both heteroatoms.

5. The non-silane polymeric coupler according to claim 1, wherein the dendritic polymer core comprises at least an ether bond (—O—), an amide bond

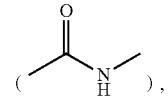

a urethane bond (—NICOO—), animine bond (—NH—), a tertiary amine

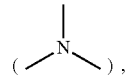

a primary amine or an ester bond

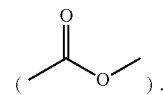

6. The non-silane polymeric coupler according to claim 1, wherein the at least one reactive end group constitutes about 10% to about 40% of end groups of the non-silane polymeric coupler.

7. The non-silane polymeric coupler according to claim 1, wherein the compatibilizing end group is a hydrophobic group selected from the group consisting of alkyl, aryl, alkylaryl, arylalkyl, alkylalkoxy, and arylalkoxy.

8. The non-silane polymeric coupler according to claim 1, wherein the compatibilizing end group is a linear alkyl group with at least 8 carbon atoms.

9. The non-silane polymeric coupler according to claim 1, wherein the non-silane polymeric coupler is obtained by attaching; at least one reactive group to a dendritic polymer as the at least one reactive end group.

10. The non-silane polymeric coupler according to claim 9, wherein the dendritic polymer comprises at least a hyperbranched polymer containing O or N or both heteroatoms.

11. The non-silane polymeric coupler according to claim 9, wherein the dendritic polymer comprises a polyethylenimine.

12. The non-silane polymeric coupler according to claim 9, wherein the dendritic polymer comprises a hyperbranched polyglycidol or a hyperbranched copolymer of glycidol and an epoxide.

13. A vulcanizable rubber composition, comprising:
   (A) a diene-based rubber,
   (B) silica, and
   (C) the non-silane polymeric coupler as defined by claim 1.

14. The vulcanizable rubber composition according to claim 13, wherein the diene-based rubber contains olefinic unsaturation.

15. The vulcanizable rubber composition according to claim 13, wherein the vulcanizable rubber composition comprises about 50 to about 150 parts by weight of silica per 100 parts of the diene-based rubber.

16. The vulcanizable rubber composition according to claim 13, wherein the vulcanizable rubber composition comprises about 0.5 to about 20 parts by weight of the non-silane polymeric coupler per 100 parts of the diene-based rubber.

17. A pneumatic tire made from the vulcanizable rubber composition according to claim 13.

18. A pneumatic tire tread made from the vulcanizable rubber composition according to claim 13.

19. A process for manufacturing a non-silane polymeric coupler as defined by claim 1, comprising the steps of:
   a) providing a dendritic polymer capable of interacting with silica, and
   b) attaching at least one reactive group toward a diene-based rubber to the dendritic polymer as the at least one reactive end group.

* * * * *